United States Patent
Law et al.

(10) Patent No.: US 6,537,407 B1
(45) Date of Patent: Mar. 25, 2003

(54) PROCESS FOR THE MANUFACTURE OF AN IMPROVED LAMINATED MATERIAL

(75) Inventors: Paul William Law, Warwickshire (GB); Tony Longdon, Derbyshire (GB); Donald Taylor, Englewood Cliffs, NJ (US); Gordon Willins, Nottingham (GB)

(73) Assignee: Acordis Acetate Chemicals Limited, Derby (GB)

( * ) Notice: Subject to any disclaimer, the term of this patent is extended or adjusted under 35 U.S.C. 154(b) by 114 days.

(21) Appl. No.: 09/655,731

(22) Filed: Sep. 6, 2000

(51) Int. Cl.$^7$ ............................................... B32B 23/06
(52) U.S. Cl. ........................... 156/209; 281/20; 281/29; 428/172; 428/511
(58) Field of Search ................................ 428/141, 172, 428/507–513; 281/20, 29, 36; 283/64; 156/219, 209, 324

(56) References Cited

U.S. PATENT DOCUMENTS

| | | | | |
|---|---|---|---|---|
| 2,992,153 A | * | 7/1961 | Lutwack | 156/154 |
| 4,298,976 A | | 11/1981 | Irvin | 369/282 |
| 5,316,825 A | | 5/1994 | Nakai | 428/156 |
| 5,376,434 A | | 12/1994 | Ogawa | 428/195 |
| 6,153,298 A | * | 11/2000 | Joson | 428/340 |
| 6,248,401 B1 | * | 6/2001 | Chiang et al. | 427/250 |
| 6,340,530 B1 | * | 1/2002 | Porter et al. | 264/165 |

FOREIGN PATENT DOCUMENTS

| | | |
|---|---|---|
| EP | 604865 | 7/1994 |
| EP | 802069 | 10/1997 |
| GB | 995591 | 6/1965 |
| GB | 1168490 | 10/1969 |
| GB | 1493512 | 11/1977 |
| GB | 2104847 | 3/1983 |
| GB | 2311752 | 10/1997 |
| GB | 2343863 | 5/2000 |
| WO | WO89/03760 | 5/1989 |

* cited by examiner

*Primary Examiner*—Michael W. Ball
*Assistant Examiner*—Barbara J. Musser
(74) *Attorney, Agent, or Firm*—Howson and Howson

(57) ABSTRACT

A process for the manufacture of a composite laminate which includes a thermoplastic film laminated to a substrate. The front surface of the film has a regular embossed pattern of protrusions which have a height in the range of 0.5 to 10 microns and a separation in the range 20 to 400 microns. The rear surface of the film confronts and is bonded to the substrate. The manufacturing process of the composite includes the steps of applying a layer of a melt adhesive between the rear surface of the film having a regular embossed pattern on its front surface and the substrate to form a composite, and running the composite of the film, the layer and the substrate between nip rollers to apply pressure to the composite whilst the adhesive is in a heated condition, so as to effect thermal lamination of the film to the substrate.

10 Claims, 1 Drawing Sheet

PROCESS FOR THE MANUFACTURE OF AN IMPROVED LAMINATED MATERIAL

The present invention relates to a process for the production of an improved laminated material. The invention relates in particular to a process for the production of a laminated material in which a film of cellulose acetate, in particular cellulose diacetate, is laminated to a printed substrate.

It is known to laminate clear glossy, matt or semi-matt films of materials such as cellulose acetate or diacetate to printed material, for use for example for book covers and in packaging material.

A range of cellulose diacetate films has recently been developed, which films have a matt or semi-matt finish which is particularly distinctive and attractive and which also has other desirable properties, which are unique to these materials. These films are plastics films, in particular cellulose diacetate films, which are marketed under the Trade Mark Semitone by Acordis Acetate Products Ltd (Clarifoil). Semi-matt or matt plastics films of this type, and a process for their manufacture, are described in European Patent Application No. 0 802 069 A1, the contents of which are incorporated herein by reference, and the films described in that patent application are particularly suitable for use in the material and process of the present invention. These matt or semi-matt films are characterised by a regular embossed pattern of depth 0.5 to 10 microns and repeat distance 20 to 400 microns and it is taught in the specification that these films can be laminated over printed paperboard. The characteristic properties of these films include the ability to emit a characteristic noise of reproducible pitch when two films are rubbed together and also a high resistance to finger marking. These properties are due to the embossed surface of the film and it has therefore up until now been the practice to use a wet, cold lamination process to laminate these films to a substrate using a lamination technique which does not involve heating the film, so that no deformation of the embossed surface of the film, and hence impairment of these characteristic properties, would occur in the lamination process.

Thermal lamination is a very popular process for book cover lamination, especially for paperback books. In a thermal lamination process, a melt coating is extruded onto the film, the coated film is chilled and then wound up as a roll of film with dry adhesive already applied. The laminator then needs to run this film over a simple hot roller, melting the adhesive, and pressure nip it onto the substrate, suitably a printed board, by running the film and substrate between nip rollers. The process is more expensive than wet lamination, but requires less skill, and therefore has been taken up by printers, who can therefore shorten their turn round times by not needing out-of-house contract lamination.

In an alternative form of thermal lamination, which is also referred to as encapsulation, a printed substrate such as a restaurant menu or a poster, is laminated between two sheets of film to encapsulate the paper. Encapsulation is generally carried out with thicker films and thicker coatings than are used for thermal lamination on one side of a substrate.

Matt finishes feature prominently for book cover lamination. Matt oriented polypropylene film is widely used, but is prone to scuffing and marking. In the United States, in particular, higher levels of humidity, in particular in southern states, mean that curl of book covers can be a severe problem. So called "layflat" nylon films have been introduced which give improved curl correction, but at the expense of even worse scratch and scuff resistance.

It is an object of the present invention to provide a process for the manufacture of an improved laminate. It is a further object of the present invention to provide a process for the manufacture of an improved laminate in which the disadvantages of known laminates are reduced or substantially obviated.

The present invention provides a process for the manufacture of a laminate which comprises a thermoplastic plastics film having, on at least one side, an embossed pattern of protrusions having a height in the range of 0.5 to 10 microns and a separation in the range 20 to 400 microns, laminated to a substrate in which the improvement comprises the use of a thermal lamination process, which process includes the steps of applying a melt coating between the film and the substrate and running the film and substrate, whilst the adhesive is in a heated condition, between nip rollers to apply pressure thereto, so as to effect lamination of the film to the substrate. In a preferred embodiment of the process according to the present invention, the thermoplastic plastics film is a matt or semi-matt plastics film and is preferably a cellulose acetate film, more preferably a cellulose diacetate film.

The melt coating is preferably applied to the film, more preferably by an extrusion process. In a particularly preferred embodiment of the process according to the invention, the coated film is chilled after the adhesive has been applied and the coated film is subsequently run over a heated roller to melt the adhesive.

In a preferred embodiment of the process according to the invention, the process further includes the step of winding up the roll of film with dry adhesive applied, between the chilling step and the heating step. In a particularly preferred embodiment of the process according to the invention, the dry melt adhesive is a polyethylene homopolymer or an ethylene vinyl acetate copolymer which has a melting point between 140 and 180° C. and is preferably applied by extrusion coating at a temperature close to the melting point, at which temperature the polyethylene homopolymer or ethylene vinyl acetate copolymer is molten.

The matt or semi-matt thermoplastic plastics film for use in the process according to the invention preferably has a thickness of approximately 15µ and the adhesive coating is preferably applied at a thickness of 17 to 18µ, at a temperature significantly higher than the softening point of the film.

The coated film is run over a heated roller at a temperature of about 115° C., with the side of the film with the protrusions in contact with the roller, and the adhesive is heated to a temperature of about 100° C. or above, at which temperature the adhesive is softened.

The acetate film is preferably treated prior to application of the adhesive, in a manner known per se for conventional lamination films, including acetate films, with a primer and/or by a corona discharge treatment, in order to improve the adhesion between the acetate and the adhesive and between the film and the substrate.

Where the acetate film is treated with a primer prior to the application of adhesive, the primer is preferably one conventionally used for coating, such as a polyurethane or isocyanate based primer in either aqueous solution or in an organic solvent system. Typical coating thicknesses are less than one micron.

Where the acetate film is treated by a corona discharge treatment prior to application of the adhesive, the corona is generated by applying a high voltage signal to an electrode. The substrate to be treated is passed below the electrode; beneath the substrate is a dielectric layer, with an earthed plane below the dielectric layer. When a sufficiently high voltage is applied, electrical breakdown occurs in the air gap between the electrode and the substrate, so that the substrate (film) surface is bombarded with high energy electrons. The net effect is to raise the surface energy of the film substrate. The peak voltage applied is preferably up to 30 kV, preferably at an ac frequency of between 9 to 50 kHz.

It has surprisingly been found that when a matt or semi-matt thermoplastic plastics film having an embossed pattern of protrusions having a height in the range of 0.5 to 10 microns and a separation in the range 20 to 400 microns is laminated to a substrate by means of a thermal lamination process, the resultant laminated material retains the characteristic properties given to the film by the protrusions in the unlaminated material.

This result is particularly surprising in view of the fact that uncoated cellulose diacetate film demonstrates significant softening in the temperature range 140 to 150° C. and even at temperatures above 100° C., there is noticeable shrinkage in both width and length.

In particular, the laminates according to the invention demonstrate substantially better resistance to finger marking, scratching, scuffing and abrasion than laminates of matt oriented polypropylene or nylon. The print sharpness and contrast, and the colour of the laminated material are enhanced and there is an improvement in the angle of viewing, partially but not entirely due to gloss reduction. It has also been found that the laminates, when applied over printed text, improve the readability of the text, especially where the reader is dyslexic. It is believed that this effect is due to increased focussing of the reader's eye as the text is being scanned.

It has also been found that the coated film produced in the process according to the invention demonstrates increased tear resistance compared to the uncoated film, both in the initiation and the propagation of tears. This increased tear resistance is of value both during the lamination process, where it is possible to carry out the process more rapidly, and for the finished article, which demonstrates increased resistance to tearing.

In addition, cellulose diacetate films tend to expand and contract with changing humidity in the same way as paper, although paper is more directional because of the effect of the fibre grain. In principle therefore, as humidity changes, an acetate film will tend to move in the same direction as the paper to which it is laminated, helping to reduce curl effects. The laminates according to the present invention tend to give similar, or slightly improved results compared to matt oriented polypropylene film. Matt nylon indeed gives the best layflat properties, but the improvement over acetate is not significant.

Finally, the laminates according to the present invention, in particular those which comprise a film of the type described and claimed in European Patent Application No. 0 802 069 A1 and marketed under the Trade Mark "Semitone" have a very distinctive "handle" compared with the known laminates. Matt oriented polypropylene film is waxy; matt nylon is rather rough and matt polyethylene terepthalate has a "synthetic" feel and also curls and fingermarks extremely badly, whereas the laminates according to the present invention have a softer more natural feel.

The application of the process of the invention will now be illustrated by means of the following Example and accompanying drawings which show schematically the stages in the manufacture of a laminate:

EXAMPLE

The example describes a two-stage thermal lamination process comprising the steps of:

(1) An initial coating process where a hot melt adhesive is extrusion-coated onto a thermoplastic Semitone cellulose acetate film. This process is typically carried out on fill width "master rolls".

(2) The coated master rolls are subsequently slit to a narrower web width, suitable for laminating to printed board. The second stage of the lamination process involves passing the extrusion-coated film over a heated roller surface to soften/melt the coating, immediately thereafter pressing the softened coated surface against a printed board surface using a nip roller. The laminated board (in sheet or roll form) is collected after the nip.

1. Thermal Coating

A 15-micron ($\mu$) thickness Semitone film produced in accordance with the process described in EP A 802 069, was used as the substrate. The semi-matt surface consists of an array of raised "dots" or cones on the film surface. The approximate space of the array is 60$\mu$(peak to peak), with a peak height of the order of 0.5–1.0$\mu$. The reverse surface of the film, which is the surface to be coated, is approximately flat and semi-glossy in appearance. The Semitone film is based on cellulose diacetate with around 15% of suitable plasticiser, eg diethyl phthalate. Such a film shows a thermal glass transition temperature around 123° C. (253° F.) and softens significantly at a temperature around 140° C. (284° F).

Figure 1:
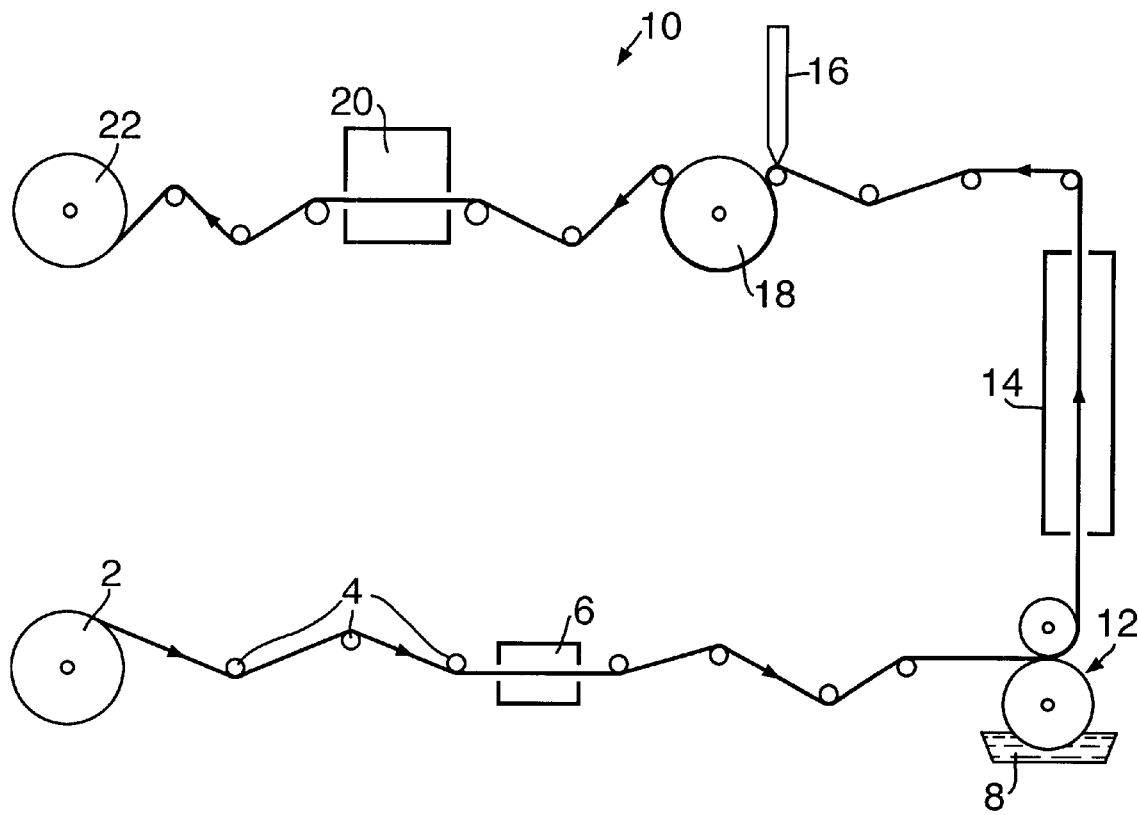
FIG. 1 is a schematic view of a thermal coating line according to the present inventions.

FIG. 1 shows a schematic sketch of a thermal coating line shown generally at 10. Semitone film was pulled from the unwind station 2 under controlled tension over a series of rollers 4. The film surface to be coated can be corona discharged at 6 if required. A very thin layer of primer 8 was then applied at the primer station 12 to the film surface to be coated, to promote adhesion between the film surface and the thermal coating. A range of proprietary primers are available and can be applied as water or solvent borne systems. The coating thickness is typically less than 1$\mu$. After priming, the primer was dried in a vertical air oven 14 at around 82° C. (180° F.), before the film passed on to the extrusion coating head 16.

The hot melt adhesive was an ethylene vinyl acetate co-polymer with a melt flow index suitable for hot melt coating. The melt temperature at the point of coating, as the hot melt was extruded through a slot die, was around 180° C. (325° F.). The coating weight applied was 17–18$\mu$. After the hot melt coating had been uniformly applied to the primed film surface, it was immediately squeezed against a chill roller 18 at 15° C. (60° F.) to solidify the hot melt. The film was then given a corona discharge on the hot melt surface at 20 to improve subsequent adhesion, the edges were trimmed and the roll was wound up at the windup station 22.

A speed of 180 meter per minute (600 ft.min$^{-1}$) was used in the current example.

2. Thermal Lamination

Figure 2:
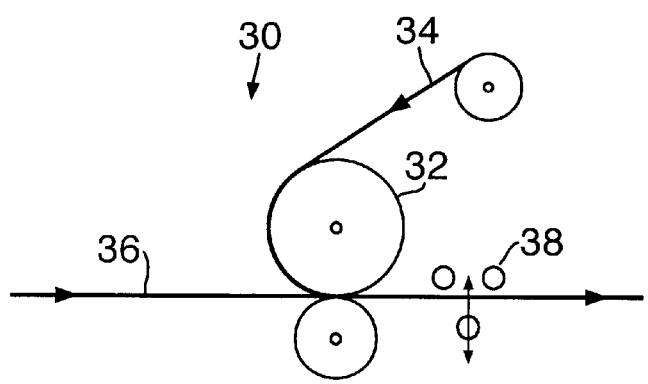
FIG. 2 is a schematic view of a thermal lamination line according to the present invention.

Film from the above-coated reel can be slit down to a convenient lamination width using a conventional razor blade slitting machine. The hot melt adhesive coating can, in fact, improve the ease of slitting of the cellulose acetate film since it provides additional strength and toughness. FIG. 2 shows a schematic sketch of a thermal lamination line shown generally at 30.

A 635 mm (25") wide sample of the thermally coated Semitone film was laminated on a desktop roller laminator 30, using a range of different temperatures for the heated roller 32, as shown in FIG. 2. The film 34 was laminated along with thermally coated matt polypropylene and gloss polyester, for comparison. The overall thickness of each film was between 30$\mu$ and 32$\mu$. Each film was run at 1 m.min$^{-1}$ which is slower than the speed at which a commercial laminator would operate, and at temperatures of 100° C. (212° F.), 110° C. (230° F.) and 120° C. (284° F.). The films were laminated to printed boards 36 weighing approximately 200 gm$^{-2}$ and thicker boards at 300 gm$^{-2}$. Some Semitone was also laminated at 130° C. (266° F.).

Under all temperature and pressure conditions the Semitone embossed film laminated to give a good finish without any loss or modification of the distinctive surface characteristics. At higher temperatures of 130° C. (266° F.), some curl was observed in the Semitone laminates, but this was reduced or not present when lamination temperatures of 115° C. (240° F.) or lower were used. The curl correction device 38 fitted to the laminator was not used. The following observations were made when the laminates of the various films were examined:

(1) At laminating temperatures up to 110° C., Semitone showed similar curl to the polypropylene and polyester laminates.
(2) In normal handling, Semitone laminates appeared to give much the best scratch, scuff and finger marking resistance. This result was subsequently confirmed by carrying out comparative tests on the Pira Rub Tester, BS.3110. In this test, a small disk of laminated material was rubbed against a larger disk of the same material under a pressure of 2 psi. The smaller disk rotates in a planetary motion about the rim of the larger disk, at the same time spinning on its own axis. The test was carried out for 25 rubs. After carrying out the test, the different samples were compared visually.
(3) The Semitone laminate demonstrated the distinctive sound characteristically observed with unlaminated film, when rubbed. The "handle" of the surface appeared more "natural" than the rather waxy feel of the polypropylene and "synthetic" handle of the polyester laminate.
(4) the semitone laminate appeared, subjectively, to give a sharper, crisper appearance to the colour and print definition of the boards laminated, when compared with the polypropylene and polyester laminates.

What is claimed is:

1. A process for the manufacture of a laminate which comprises a cellulose diacetate film having on its front surface a regular embossed pattern of protrusions having a height in the range of 0.5 to 10 microns and a separation in the range 20 to 400 microns, laminated on its rear surface to a substrate, which process includes the steps of applying a layer of a melt adhesive having a melting point between 140 and 180° C. as a coating to the rear surface of the film having said regular embossed pattern on its front surface, subsequently running the film bearing the layer of adhesive on its rear surface over a heated roller with the front surface of the film in contact with the roller to soften the adhesive, and then running a composite of the film, the layer and the substrate with the layer of adhesive between the film and the substrate between nip rollers to apply pressure to the composite whilst the adhesive is in a heated condition, so as to effect thermal lamination of the film to the substrate.

2. A process according to claim 1, wherein the melt adhesive layer is applied as a coating to the rear surface of the film by an extrusion process.

3. A process according to claim 1, wherein the film bearing the layer of adhesive on its rear surface is chilled after the adhesive has been applied.

4. A process according to claim 3 wherein the process further includes the step of winding up the chilled film with applied adhesive as a roll before it is run over a heated roller to melt the adhesive.

5. A process according to claim 1 wherein the melt adhesive is an ethylene homopolymer or an ethylene vinyl acetate copolymer.

6. A process according to claim 1, wherein the melt adhesive is applied to the rear surface of the film at a temperature in the upper end of its melting point range.

7. A process according to claim 1, wherein the film has a thickness of 15 microns.

8. A process according to claim 1 wherein the melt adhesive is applied at a thickness of 17 to 18 microns.

9. A process according to claim 1, wherein the melt adhesive is applied to the rear surface of the film at a temperature higher than the softening point of the film.

10. A process according to claim 3 wherein the heated roller is heated to a temperature of about 115° C.

* * * * *